United States Patent [19]

Charles et al.

[11] 4,193,435
[45] Mar. 18, 1980

[54] FLOATING NUT RETENTION SYSTEM

[76] Inventors: Robert A. Frosch, Administrator of the National Aeronautics and Space Administration, with respect to an invention of James F. Charles, Norco; Harry A. Theakston, Tustin, both of Calif.

[21] Appl. No.: 938,582

[22] Filed: Aug. 31, 1978

[51] Int. Cl.² ............................................. F16B 37/06
[52] U.S. Cl. .................................................. 151/41.76
[58] Field of Search ................. 151/41.76, 41.75, 41.7; 85/32 K

[56] References Cited

U.S. PATENT DOCUMENTS

| | | | |
|---|---|---|---|
| 2,421,201 | 5/1947 | Hallock | 151/41.76 X |
| 2,825,380 | 3/1958 | Reiner | 151/41.76 |
| 3,219,086 | 11/1965 | Zahodiakin | 151/41.76 X |

Primary Examiner—Ramon S. Britts
Attorney, Agent, or Firm—Marvin J. Marnock; John R. Manning; Marvin F. Matthews

[57] ABSTRACT

A floating nut retention system includes a nut having a central aperture therein. An inner retainer plate has an opening therein, the nut being secured to the inner retainer plate with the nut aperture and the inner retainer plate opening being fixedly aligned therewith. An outer retainer member is formed of a base plate having an opening therein and having a surface adjacent a surface the inner retainer plate. The outer retainer member includes a securing mechanism for retaining the inner retainer plate adjacent to the outer retainer member. The securing mechanism enables the inner retainer plate to float with respect to the outer retainer member, while simultaneously forming a bearing surface for said inner retainer plate.

1 Claim, 5 Drawing Figures

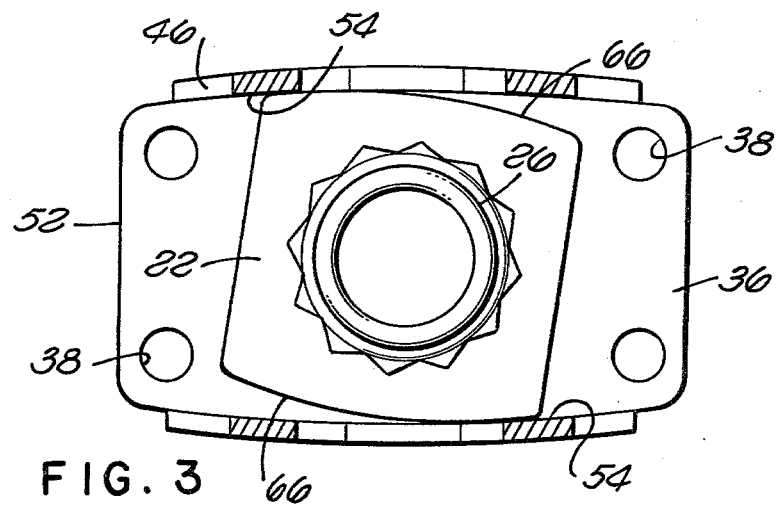
FIG. 3
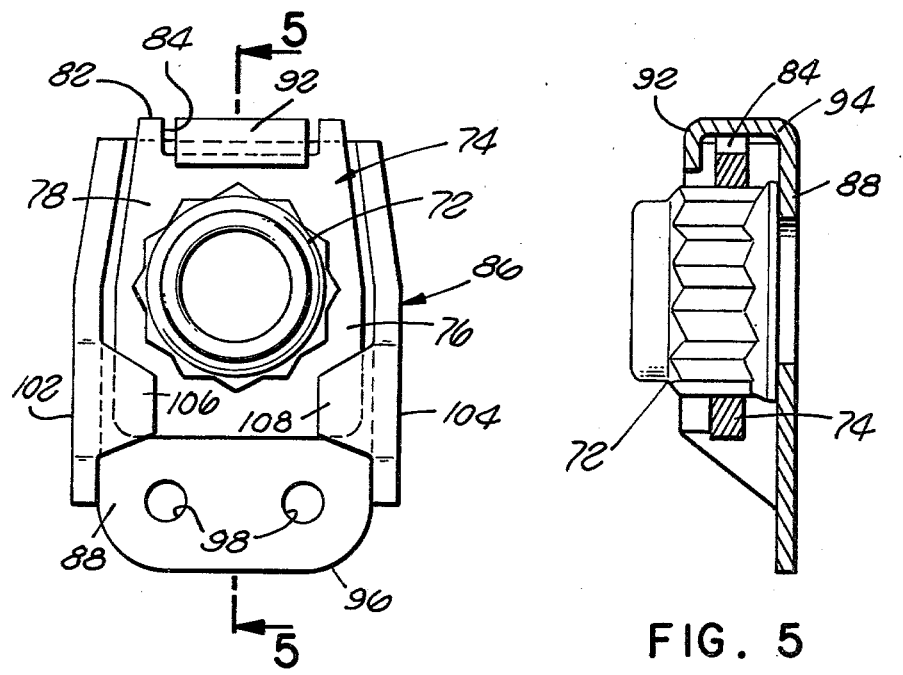
FIG. 4
FIG. 5

FLOATING NUT RETENTION SYSTEM

BACKGROUND OF THE INVENTION

1. Field of the Invention

The field of art to which the invention pertains includes the field of floating nut retention systems, particularly, with respect to a retention system having a load bearing surface providing a significant bearing area for use in high torque applications.

2. Description of the Prior Act

Prior art floating nut retention systems are limited to low strength hardware. Typically, the load bearing was provided by a point load bearing member which limited the floating nut design to low torque applications. Where high strength hardware necessitates high torque applications, precision drilling is required with access to the nuts or bolts needed from multi-sided locations.

Known prior art includes U.S. Patent Nos. 490,553; 843,840; 1,143,254; 1,261,616; 1,269,059; 2,381,233; 2,423,198; 3,727,969; and 3,875,985.

SUMMARY OF THE INVENTION

A floating nut retention system includes a nut having a central aperture therein. An inner retainer plate has an opening therein. The nut is secured to the inner retainer plate with the nut aperture being aligned with the inner retainer plate opening. An outer retainer member is formed of base plate having an opening therein and a surface adjacent a surface of the inner retainer. A securing mechanism for retaining the inner retainer plate adjacent to the outer retainer member enables the inner retainer plate to float with respect to the outer retainer member while, simultaneously, forming a bearing surface for the inner retainer plate.

The present invention provides a nut and retainer plate which are permanently assembled to produce a single unitized floating nut plate. The radial float of the present invention prevents misalignment while, simultaneously, providing a load bearing surface sufficiently large to enable the use thereof in high torque applications.

The advantages of this invention, both as to its construction and mode of operation, will be readily appreciated as the same becomes better understood by reference to the following detailed description when considered in connection with the accompanying drawings in which like reference numerals designate the like parts throughout the Figures.

BRIEF DESCRIPTION OF THE DRAWINGS

FIG. 3 is a cross-sectional view of the floating nut retention system taken along the line 3—3 of FIG. 2;

FIG. 4 is a top plan view of the alternate arrangement of the floating nut retention system; and FIG. 5 is a cross-sectional view of the arrangement of FIG. 4 taken along the line of 5—5 thereof.

DESCRIPTION OF THE PREFERRED EMBODIMENTS

Figure 1:
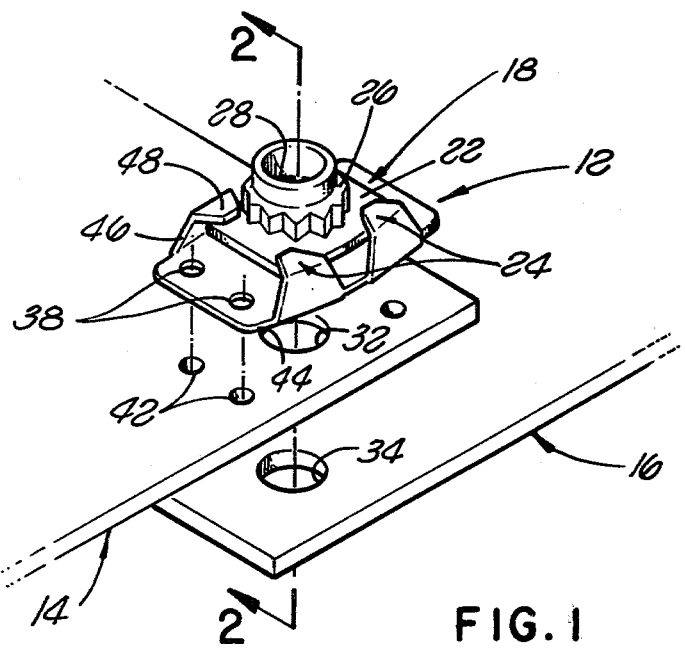
FIG. 1 is a perspective view illustrating the technique of assembling of the floating nut retention system.

Referring now to the drawings, there is shown in FIG. 1, a flotating nut retention system 12 constructed in accordance with the principles of the invention. The floating nut retention system of FIG. 1 is utilized to secure an upper structural wall 14 to a lower structural wall 16.

In the embodiment of FIG. 1 an outer retainer member 18 is initially riveted to the upper structural wall 14. A floating inner retainer plate 22 is held adjacent the outer retainer member 18 by means of a plurality of retainer member tangs 24. The inner retainer plate 22 includes a multiple point nut 26 which is pressed fit therein. The interior of the multiple point nut has a threaded opening 28 which is generally aligned with bolt openings 32 and 34 of the upper structural wall 14 and the lower structural wall 16, respectively. When a bolt (not shown in FIG. 1) is inserted through the openings 34 and 32, and hence into the threaded opening 28 of the nut 26, the floating inner retainer plate 22 eliminates the need for precision drilling. In addition, as the bolt is fastened, the floating inner retainer plate 22 is curved to mate with load bearing surfaces of the tangs 24 providing a significant bearing contact area.

Figure 2:
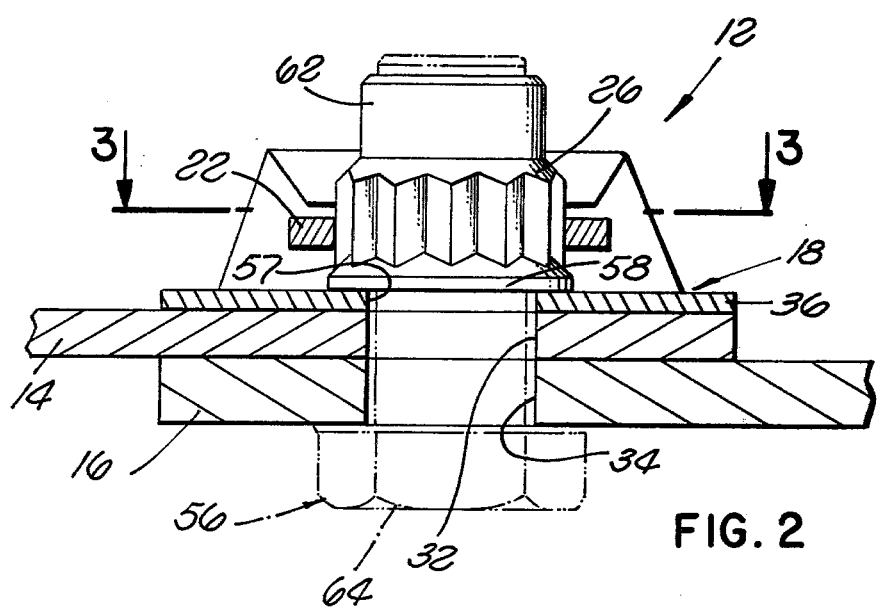
FIG. 2 is a cross-sectional view of the floating nut retention system wherein the system is illustrated securing a pair of plates together taken along the line 2—2 of FIG. 1.

Referring now to FIG. 2 the floating retention system 12 is shown in greater detail. The outer retainer member 18 includes a base plate 36 whose bottom surface is juxtaposed with the top surface of the upper structural wall 14. As can be seen in FIG. 1 the base plate 36 includes a plurality of apertures 38 which are generally aligned with apertures 42 in the upper structural wall 14 and enable the outer retainer member 18 to be riveted to the upper structural wall.

A pair of tangs 24 are integrally formed with each side edge 44 of the base plate 36. Each tang 24 includes an upperly extending leg 46 and a foot 48 which extends inwardly toward the opposed tang 24. As can be seen in FIG. 3, the base plate 36 has a maximum width at its center and tapers slightly toward the ends 52 of the base plate. However, the base plate 36 is sufficiently tapered so that the tang leg 46 interior bearing surface 54 will prevent the floating inner retainer plate 22 from being removed from the outer retainer member 18 when the plate 22 is moved in a plane parallel to the plane of the base plate 36. Additionally, the tang inwardly extending legs 46 prevent the floating inner retainer plate 22 from being moved in a direction perpendicular to the plane of the base plate 36.

Referring again to FIG. 2, when a bolt 56 is inserted through the upper and lower structural wall openings 34 and 32, respectively, an opening 57 in the base plate 36, and then threaded into the nut opening 28, a nut downwardly facing shoulder 58 abuts the top surface of the base plate 36. In addition, it should be noted that a sleeve 62 extends upwardly from the top end of the multiple point nut 26 increasing the threaded surface area of the nut. Once the head 64 of the bolt 56 is positioned adjacent the lower surface of the lower structural wall 16, further tightening of the bolt 56 caused the inner retainer plate 22 side edges 66 (FIG. 3) to abut diagonally opposed edges of two of the tangs 24 interior bearing surfaces 54.

It should be noted, as shown in FIG. 3, that the inner retainer plate 22 width is tapered from a maximum width at the center of the plate to a minimum width at the ends thereof. This construction is somewhat similar in design as the base plate 36 of the outer retainer member 18. Typically, it has been found that an elliptical taper on both the inner retainer plate 22 and the base plate 36 provides a maximum bearing load surface for mating of the inner retainer plate side edges 66 and the inner bearing surfaces 54 of the tangs 24. Additionally, it should be noted that the present design enables high torque applications to be achieved with access required to only one side i.e., the bolt head 64.

Referring now to FIG. 4 there is shown an alternative arrangement of the floating nut retention system. In the arrangement of FIG. 4, a multi-pointed nut 72, which is similar to the type shown in the embodiment of FIGS. 1 through 3, is again utilized and positioned in a floating inner retainer plate 74. The floating inner retainer plate 74 is generally of a uniform thickness along one-half 76 thereof about the nut 72. The other half 78 of the inner retainer plate 74 is slightly tapered towards an end 82. The retainer plate end 82 has a central slot 84 formed therein.

An outer retainer member 86 is formed of a base plate 88 having an L-shaped tongue 92. The L-shaped tongue extends upwardly from one end 94 of the base plate 88, through the retainer plate central slot 84, and over the top surface of the retainer plate 74. The other end 96 of the base plate 88 includes a pair of openings 98 which are used to secure the retention system to a support plate such as by riveting as described in the embodiments of FIGS. 1 through 3.

The outer retainer member 86 further comprises a pair of vertically extending side walls 102 and 104. The side walls 102 and 104 are formed in a plane perpendicular to that of the base plate 88 and the retainer plate 74. As shown in FIG. 4, the side walls 102 and 104 are normally spaced a generally equal distance from the halves of the floating inner retainer plate prior to securing a bolt through the nut 72. Flanges 106 and 108 extend from the top of side walls 102 and 104, respectively, adjacent the end 96 of the outer retainer member 86. The flanges 106 and 108 are positioned over the top surface of the inner retainer plate 74 and act in conjunction with the tongue 92 to allow float of the retainer plate 74 while preventing the separation of the plate 74 from the outer retainer member 86.

When a bolt is positioned through a pair of structural walls (now shown in FIGS. 4 and 5) in the manner similar to that as described in FIGS. 1 through 3, the sides of the floating inner retainer plate 74 and the outer retainer member interior side walls 102 and 104 act in conjunction with each other to provide a maximum load bearing surface.

We claim:

1. A floating nut retention system comprising:
a nut having an internally threaded central aperture;
an inner retainer plate having a flat bottom surface and an opening through said plate, said nut being secured to said inner retainer plate with said nut aperture and said inner retainer plate opening being fixedly aligned therewith,
an outer retainer member formed of a base plate having ends, an opening therein and a flat planar surface in said base plate disposed adjacent to the bottom surface of said inner retainer plate, said base plate having a pair of opposed side edges;
securing means for retaining said inner retainer plate adjacent to said outer retainer member with said opening substantially aligned while enabling the inner retainer plate to float with respect to said outer retainer member, said securing means being provided by a pair of wall structures integrally formed at each of said opposed side edges of said base plate, each wall structure being formed by an upwardly extending leg having an arcuately curved inner surface and extending generally transverse to the plane of said base plate with the maximum distance between said opposing curved surfaces at the center thereof and a foot portion on each leg extending inwardly toward the opposing wall structure and over said inner retainer plate thereby limiting movement of said inner retainer plate in the direction perpendicular to the plane of said base plate, said inner retainer plate being tapered from a maximum width at the center thereof to a minimum width at the ends thereof, said maximum width exceeding the distance between the upstanding legs of said wall structures at each end of said base plate to thereby prevent said inner plate from being removed from the outer retainer member when moved in a plane parallel to the plane of said base plate;
and load bearing surface means provided by said curved inner surfaces and adapted to engage the side edges of the inner retainer plate, said outwardly curved side edges of the inner retainer plate being curved to mate with the load bearing surfaces whereby the area of restraining surface increases with increasing torque and adapted to provide a significant bearing contact area when torque is applied during the installation or removal of a bolt extending through said openings of the inner retainer plate and said outer retainer member in threaded engagement with the nut.

* * * * *